US012397563B2

(12) United States Patent
Chandrakanthan

(10) Patent No.: US 12,397,563 B2
(45) Date of Patent: Aug. 26, 2025

(54) AUTOMATIC LABEL CREATOR AND METHOD FOR CAN DECORATING

(71) Applicant: Stolle Machinery Company, LLC, Centennial, CO (US)

(72) Inventor: Sayon Chandrakanthan, Lakewood, CO (US)

(73) Assignee: Stolle Machinery Company, LLC, Centennial, CO (US)

( * ) Notice: Subject to any disclaimer, the term of this patent is extended or adjusted under 35 U.S.C. 154(b) by 71 days.

(21) Appl. No.: 18/237,456

(22) Filed: Aug. 24, 2023

(65) Prior Publication Data

US 2025/0065645 A1 Feb. 27, 2025

(51) Int. Cl.

| | |
|---|---|
| ***B41J 3/407*** | (2006.01) |
| ***B41F 5/00*** | (2006.01) |
| ***B41J 2/005*** | (2006.01) |
| ***B41J 27/10*** | (2006.01) |

(52) U.S. Cl.

CPC ............... *B41J 3/4075* (2013.01); *B41F 5/00* (2013.01); *B41J 2/0057* (2013.01); *B41J 3/40733* (2020.08); *B41J 27/10* (2013.01); *B41J 2002/0052* (2013.01)

(58) Field of Classification Search

CPC ...... B41J 3/4075; B41J 3/40733; B41J 27/10; B41J 2/0057; B41J 2002/0052; B41F 5/00

See application file for complete search history.

(56) References Cited

U.S. PATENT DOCUMENTS

| | | | | |
|---|---|---|---|---|
| 3,031,961 A | 5/1962 | Czeropski et al. | | |
| 6,781,712 B1 * | 8/2004 | Komiyama | B41F 31/004 | 358/1.6 |
| 2003/0016979 A1 * | 1/2003 | Snape | G06K 15/102 | 400/76 |
| 2015/0183211 A1 * | 7/2015 | Petti | G03F 7/2018 | 101/36 |
| 2018/0000921 A1 | 1/2018 | Honda et al. | | |
| 2018/0201011 A1 * | 7/2018 | Efner | B41F 17/006 | |
| 2019/0243585 A1 * | 8/2019 | Ajioka | G06N 3/02 | |
| 2019/0243586 A1 * | 8/2019 | Ajioka | G06N 5/025 | |

(Continued)

OTHER PUBLICATIONS

International Searching Authority/US PCT/US24/42378, International Search Report, 2 pages, Oct. 21, 2023.

*Primary Examiner* — David H Banh

(74) *Attorney, Agent, or Firm* — Eckert Seamans Cherin & Mellott, LLC

(57) ABSTRACT

A can decorating system includes a can decorator including at least a plurality of cylinder plates and a plurality of inking stations; and a control station communicatively coupled to the can decorator. The control station includes an input apparatus; a display; a control system structured to monitor and control operations of the can decorator; and an automatic label creator structured to receive a label specification, create a label, determine values for image registration based at least in part on the label specification and data associated with previously applied labels, and transmit at least the label and the values to the control station. The control system causes the plate cylinders and inking stations to be adjusted based on the label and the values of image registration. The plate cylinders and inking stations print the label on undecorated cans based on the label and the values.

20 Claims, 6 Drawing Sheets

(56) References Cited

U.S. PATENT DOCUMENTS

| | | | | |
|---|---|---|---|---|
| 2019/0332905 | A1* | 10/2019 | Nakamura | G06F 3/1285 |
| 2020/0276800 | A1* | 9/2020 | Stowitts | B65B 61/025 |
| 2020/0376535 | A1* | 12/2020 | Rukat | B21D 22/30 |
| 2021/0008650 | A1 | 1/2021 | Wu et al. | |
| 2021/0026879 | A1 | 1/2021 | Huang et al. | |
| 2021/0070038 | A1* | 3/2021 | Pomerantz | B41J 2/0057 |
| 2022/0019409 | A1 | 1/2022 | Bharadwaj et al. | |
| 2022/0245450 | A1* | 8/2022 | Nishimura | G06N 3/045 |
| 2022/0277198 | A1* | 9/2022 | Watanabe | G06N 3/08 |

* cited by examiner

AUTOMATIC LABEL CREATOR AND METHOD FOR CAN DECORATING

FIELD OF THE INVENTION

The disclosed concept relates generally to an apparatus and method for decorating cans using a can decorator and, more particularly, to an automatic label creator and method for can decorating.

BACKGROUND OF THE INVENTION

High speed continuous motion machines for decorating cans, commonly referred to as "can decorator machines" or simply "can decorators," are generally well known. FIG. 1 shows a can decorator 10. As shown in FIG. 1, a can decorator 10 includes an infeed conveyor 15, which receives cans 16 from a can supply (not shown) and directs them to arcuate cradles or pockets 17 along the periphery of spaced parallel rings secured to a pocket wheel 12. The pocket wheel 12 is fixedly secured to a continuously rotating mandrel carrier wheel 18, which in turn is keyed to a continuously rotating horizontal drive shaft 19. Horizontal spindles or mandrels (not shown), each being pivotable about its own axis, are mounted to the mandrel carrier wheel 18 adjacent its periphery. Downstream from the infeed conveyor 15, each spindle or mandrel is in closely spaced axial alignment with an individual pocket 17, and undecorated cans 16 are transferred from the pockets 17 to the mandrels. Suction applied through an axial passage of the mandrel draws the can 16 to a final seated position on the mandrel.

While mounted on a mandrel, each can 16 is decorated by being brought into engagement with a blanket (e.g., without limitation, a replaceable adhesive-backed piece of rubber) disposed on a blanket wheel of the multicolor printing unit indicated generally by reference numeral 22. Thereafter, and while still mounted on the mandrels, the outside of each decorated can 16 is coated with a protective film of varnish applied by engagement with the periphery of a varnish applicator roll (not shown) rotating on a shaft 23 in the overvarnish unit indicated generally by reference numeral 24. Cans 16 with decorations and protective coatings thereon are then transferred from the mandrels to suction cups (not shown) mounted adjacent the periphery of a transfer wheel (not shown) rotating on a shaft 28 of a transfer unit 27. From the transfer unit 27 the cans 16 are deposited on generally horizontal pins 29 carried by a chain-type output conveyor 30, which carries the cans 16 through a curing oven (not shown).

While moving toward engagement with an undecorated can 16, the blanket wheel engages a plurality of plate cylinders 31, each of which is associated with an individual inking station 32 (an exemplary eight inking stations 32 are shown in FIG. 1). The plurality of plate cylinders 31 and the inking stations 32 place a label on a can 16 based on a specification from a vendor. Typically, each inking station 32 provides a different color ink and each plate cylinder 31 applies a different ink image segment to the blanket. All of the "ink image" segments combine to produce a "main image" (i.e., a label) that is structured to be applied to the can body. The "main image" is then transferred to undecorated cans 16 and becomes, as used herein, the "can body applied image."

Each inking station 32 includes a plurality of rollers, or as used herein, "rolls," that are structured to transfer a quantity of ink from a reservoir, or as used herein an "ink fountain," to the blanket. The path that the ink travels is, as used herein, identified as the "ink train." That is, the rolls over which the ink travels define the "ink train." Further, as used herein, the "ink train" has a direction with the ink fountain being at the "upstream" end of the ink train and a plate cylinder 31 at the "downstream" end of the ink train.

The ink train extends over a number of rolls each of which has a purpose. As shown, the ink train starts at the ink fountain and is initially applied as a film to a fountain roll. The fountain roll is intermittently engaged by a ductor roll. When the ductor roll engages the fountain roll, a quantity of ink is transferred to the ductor roll. The ductor roll also intermittently engages a downstream roll and transfers ink thereto. The ductor roll has a "duty cycle" which, as used herein, means the ratio of the duration of the ductor roller being in contact with the fountain roller divided by the duration of a complete cycle (ductor roller in contact with the fountain roller, move to the first downstream roller, contact with first steel roller, move back to fountain roller).

The other rolls include, but are not limited to, distribution roll(s), oscillator roll(s), and transfer roll(s). Generally, these rolls are structured to distribute the ink so that a proper amount of ink is generally evenly applied to the plate cylinder 31. For example, the oscillator rolls are structured to reciprocate longitudinally about their axis of rotation so as to spread the ink as it is applied to the next downstream roll. The final roll is the plate cylinder 31 which applies the ink to the blanket. It is understood that each inking station 32 applies an "ink image" of a single selected color to the blanket and that each inking station 32 must apply the ink image in a proper position relative to the other ink images so that the main image does not have offset ink images.

Thus, as used herein, an "ink image" means the image of a single ink color which is part of a "main image." As used herein, a "main image" means an image created from a number of ink images and which is the image that is applied to a can body as the "can body applied image." It is understood that a "main image" includes a number, and typically a plurality, of ink images. For example, if the main image was the French flag (which is a tricolor flag featuring three vertical bands colored blue (hoist side), white, and red), an inking station 32 with blue ink would provide an ink image that is a blue rectangle, an inking station 32 with white ink would provide an ink image that is a white rectangle and an inking station 32 with red ink would provide an ink image that is a red rectangle. Further, presuming that the main image was of a French flag with the hoist side on the left, the inking station 32 with blue ink would provide the blue rectangle ink image on the left side of the blanket, the inking station 32 with white ink would provide the white rectangle ink image on the center of the blanket immediately adjacent the blue rectangle ink image, and the inking station 32 with red ink would provide the red rectangle ink image on the right side of the blanket immediately adjacent the white rectangle ink image. Once all the ink images are applied to the blanket, the main image is formed and then applied to a can body.

Currently, operators of a can decorator 10 need to manually adjust mechanical components (e.g., without limitation, plate cylinders 31 and inking stations 32) of the can decorator 10 in order to determine values (e.g., setpoints, ink recipes including color parameters, etc.) for image registration for printing a label. Often, the operators must make small movements or adjustments to the mechanical components, and then check to see if a can 16 includes the label as set forth by a label specification received from a vendor. The operators repeat the manual adjustments until the label appears correctly on a can 16. Such manual adjustments require guesswork on the part of the operators until the label appears correctly on a can 16. Further, at times, what appeared to be correct may not be exactly in accordance with the label specification, resulting in wasted time and cans.

There is room for improvement in creating labels for cans during can manufacturing.

SUMMARY OF THE INVENTION

These needs, and others, are met by a can decorating system. The can decorating system includes a can decorator including at least a plurality of cylinder plates and a plurality of inking stations, each plate cylinder being associated with an individual inking station; and a control station communicatively coupled to the can decorator, the control station comprising: an input apparatus structured to receive an input including at least the label specification; a display structured to display real time information including at least the label specification; a control system structured to monitor and control operations of the can decorator; and an automatic label creator comprising a memory, the automatic label creator being structured to receive an input including at least the label specification, create a label, determine values for image registration based at least in part on the label specification and data associated with previously applied labels, and transmit at least the label and the values of image registration to the control station, where the control system causes at least the plurality of plate cylinders and the plurality of inking stations to be adjusted based at least in part on the label and the values of image registration, and where upon being adjusted, the plurality of plate cylinders and the plurality of inking stations print the label on undecorated cans based at least in part on the label and the values.

Another example embodiment of the disclosed concept provides an automatic label creator for use in can decorating by a can decorator. The can decorator has at least a plurality of plate cylinders and a plurality of inking stations, each plate cylinder associated with an individual inking station, the can decorator being communicatively coupled to a control station including a control system structured to control operations of the can decorator communicatively coupled to the control station. The automatic label creator includes an input apparatus structured to receive an input including at least a label specification obtained from a vendor; a display structured to display real time information including at least the label specification; and an automatic label creator controller comprising a memory, the automatic label creator being structured to receive an input including at least the label specification, create a label, determine values for image registration based at least in part on the label specification and data associated with previously applied labels, and transmit at least the label and the values of image registration to the control station, where the control system causes at least the plurality of plate cylinders and the plurality of inking stations to be adjusted based at least in part on the label and the values of image registration, and where, upon being adjusted, the plurality of plate cylinders and inking stations print the label on undecorated cans based at least in part on the label and the values.

Yet another example embodiment of the disclosed concept provides a method of automatically creating a label. The method includes receiving, by an automatic label creator, an input including at least a label specification; creating a label by the automatic label creator; determining, by the automatic label creator, values for image registration based at least in part on the label specification and data associated with previously applied labels; transmitting, by the automatic label creator, at least the label and the values of image registration to a control system of a control station communicatively coupled to a can decorator and structured to control operations of the can decorator, the can decorator comprising at least a plurality of plate cylinders and a plurality of inking stations; causing, by the control system, at least the plurality of plate cylinders and the inking stations to be adjusted based at least in part on the label and the values of image registration; and printing, by the plurality of plate cylinders and inking stations, the label on undecorated cans based at least in part on the label and the values.

BRIEF DESCRIPTION OF THE DRAWINGS

A full understanding of the invention can be gained from the following description of the preferred embodiments when read in conjunction with the accompanying drawings in which.

DETAILED DESCRIPTION OF THE INVENTION

Figure 1:
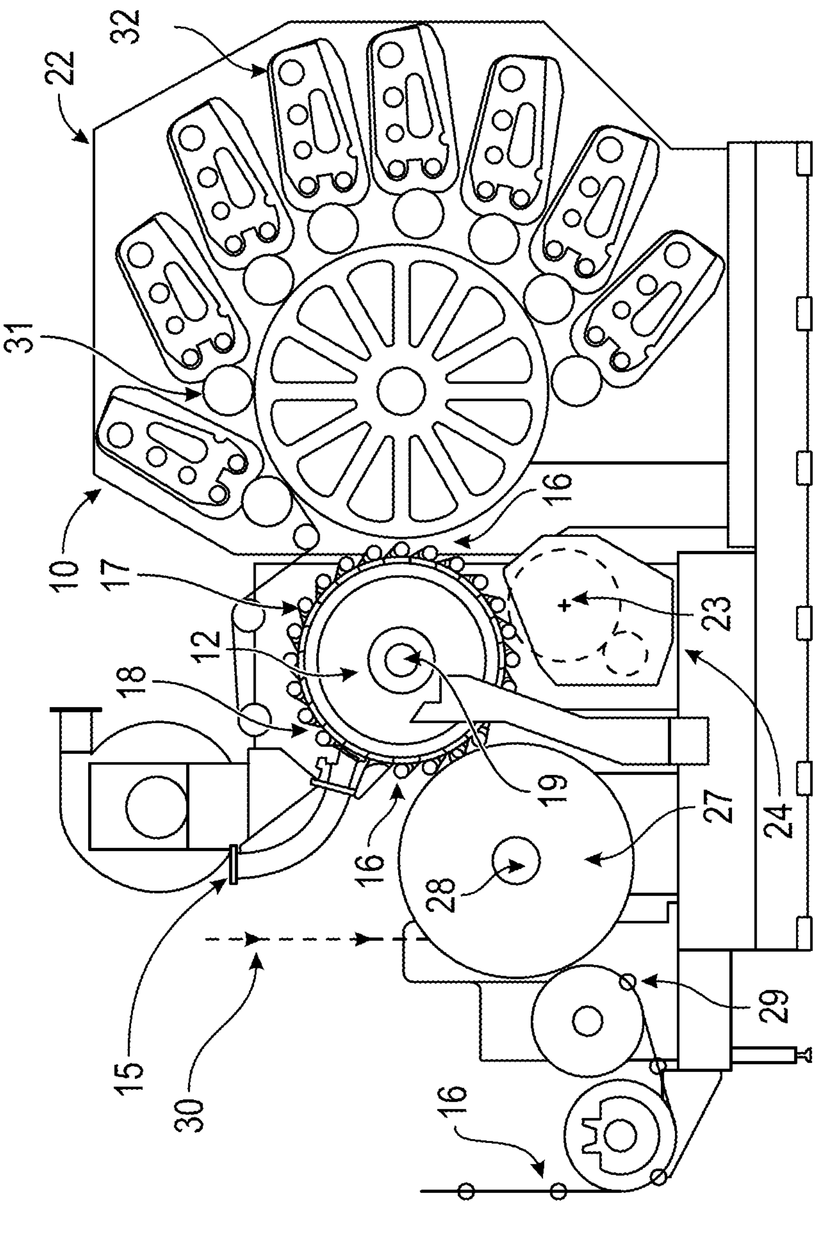
FIG. 1 is an exemplary can decorator.

It will be appreciated that the specific elements illustrated in the figures herein and described in the following specification are simply exemplary embodiments of the disclosed concept, which are provided as non-limiting examples solely for the purpose of illustration. Therefore, specific dimensions, orientations, assembly, number of components used, embodiment configurations and other physical characteristics related to the embodiments disclosed herein are not to be considered limiting on the scope of the disclosed concept.

Directional phrases used herein, such as, for example, clockwise, counterclockwise, left, right, top, bottom, upwards, downwards and derivatives thereof, relate to the orientation of the elements shown in the drawings and are not limiting upon the claims unless expressly recited therein.

As used herein, the singular form of "a," "an," and "the" include plural references unless the context clearly dictates otherwise.

As used herein, "structured to [verb]" means that the identified element or assembly has a structure that is shaped, sized, disposed, coupled and/or configured to perform the identified verb. For example, a member that is "structured to move" is movably coupled to another element and includes elements that cause the member to move or the member is otherwise configured to move in response to other elements or assemblies. As such, as used herein, "structured to [verb]" recites structure and not function. Further, as used herein, "structured to [verb]" means that the identified element or assembly is intended to, and is designed to, perform the identified verb. Thus, an element that is merely capable of performing the identified verb but which is not intended to, and is not designed to, perform the identified verb is not "structured to [verb]."

As used herein, "associated" means that the elements are part of the same assembly and/or operate together or act upon/with each other in some manner. For example, an automobile has four tires and four hub caps. While all the elements are coupled as part of the automobile, it is understood that each hubcap is "associated" with a specific tire.

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other. As used herein, "adjustably fixed" means that two components are coupled so as to move as one while maintaining a constant general orientation or position relative to each other while being able to move in a limited range or about a single axis. For example, a doorknob is "adjustably fixed" to a door in that the doorknob is rotatable, but generally the doorknob remains in a single position relative to the door. Further, a cartridge (nib and ink reservoir) in a retractable pen is "adjustably fixed" relative to the housing in that the cartridge moves between a retracted and extended position, but generally maintains its orientation relative to the housing. Accordingly, when two elements are coupled, all portions of those elements are coupled. A description, however, of a specific portion of a first element being coupled to a second element, e.g., an axle first end being coupled to a first wheel, means that the specific portion of the first element is disposed closer to the second element than the other portions thereof. Further, an object resting on another object held in place only by gravity is not "coupled" to the lower object unless the upper object is otherwise maintained substantially in place. That is, for example, a book on a table is not coupled thereto, but a book glued to a table is coupled thereto.

As used herein, the statement that two or more parts or components "engage" one another means that the elements exert a force or bias against one another either directly or through one or more intermediate elements or components. Further, as used herein with regard to moving parts, a moving part may "engage" another element during the motion from one position to another and/or may "engage" another element once in the described position. Thus, it is understood that the statements, "when element A moves to element A first position, element A engages element B," and "when element A is in element A first position, element A engages element B" are equivalent statements and mean that element A either engages element B while moving to element A first position and/or element A either engages element B while in element A first position.

As used herein, "correspond" indicates that two structural components are sized and shaped to be similar to each other and may be coupled with a minimum amount of friction. Thus, an opening which "corresponds" to a member is sized slightly larger than the member so that the member may pass through the opening with a minimum amount of friction. This definition is modified if the two components are to fit "snugly" together. In that situation, the difference between the size of the components is even smaller whereby the amount of friction increases. If the element defining the opening and/or the component inserted into the opening are made from a deformable or compressible material, the opening may even be slightly smaller than the component being inserted into the opening. With regard to surfaces, shapes, and lines, two, or more, "corresponding" surfaces, shapes, or lines have generally the same size, shape, and contours.

As used herein, the term "number" shall mean one or an integer greater than one (i.e., a plurality). That is, for example, the phrase "a number of elements" means one element or a plurality of elements. It is specifically noted that the term "a 'number' of [X]" includes a single [X].

As used herein, "about" in a phrase such as "disposed about [an element, point or axis]" or "extend about [an element, point or axis]" or "[X] degrees about an [an element, point or axis]," means encircle, extend around, or measured around. When used in reference to a measurement or in a similar manner, "about" means "approximately," i.e., in an approximate range relevant to the measurement as would be understood by one of ordinary skill in the art.

As used herein, an "elongated" element inherently includes a longitudinal axis and/or longitudinal line extending in the direction of the elongation.

As used herein, "generally" means "in a general manner" relevant to the term being modified as would be understood by one of ordinary skill in the art.

As used herein, "substantially" means "for the most part" relevant to the term being modified as would be understood by one of ordinary skill in the art.

As used herein, "at" means on and/or near relevant to the term being modified as would be understood by one of ordinary skill in the art.

Example embodiments of the disclosed concept provide an automatic label creator and method for use in can manufacturing. Upon receiving an input including a label specification obtained from a customer (e.g., without limitation, a vendor), the automatic label creator automatically creates a label. Upon creating the label, the automatic label creator determines values for image registration based at least in part on the label specification and data associated with previous labels applied by the can decorator and/or other can decorators. Then, the automatic label creator automatically transmits the label and the values for image registration to a control station communicatively coupled to the can decorator, the control station including a control system structured to monitor and control operations of the can decorator. Upon receiving the label and the values, the control system causes one or more can decorator components to be adjusted based at least in part on the label and the values for image registration. The can decorator (e.g., without limitation, a plurality of plate cylinders and a plurality of inking stations) print the label on undecorated cans 16. By automatically creating a label and adjusting the can decorator based on the label and the values for image registration, the automatic label creator eliminates repeated manual adjustments and the guesswork required by the conventional label creation systems and methods, thereby greatly expediting the label creation and changing process. By utilizing machine learning based on a large amount of data associated with the previously applied labels, the automatic label creator further increases the accuracy of the label and allows the can decorator to adjust the components thereof to correct locations and parameters at a first attempt.

Figure 2:
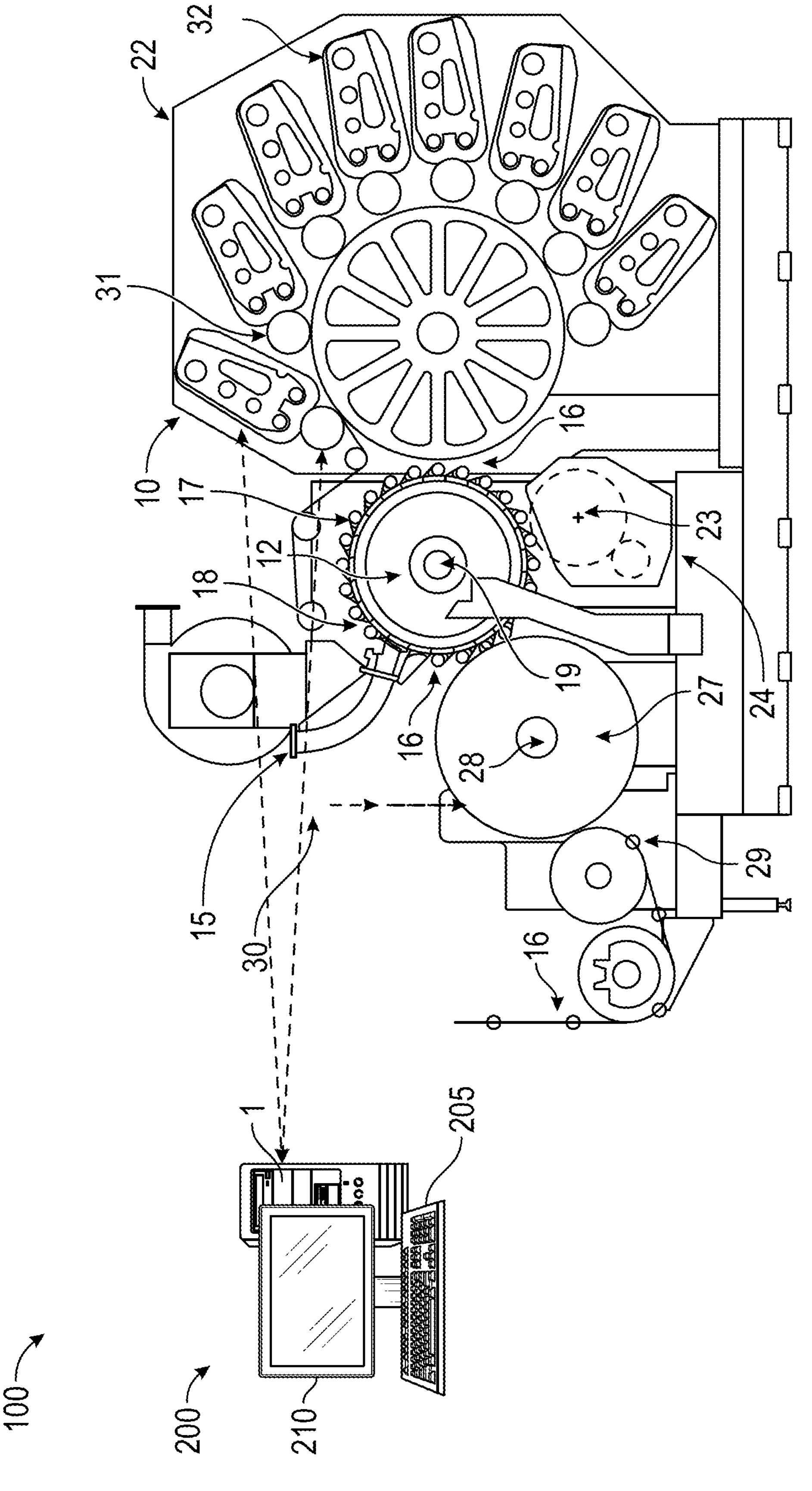
FIG. 2 is an exemplary can decorating system including an automatic label creator in accordance with a non-limiting, example embodiment of the disclosed concept.
Figure 3:
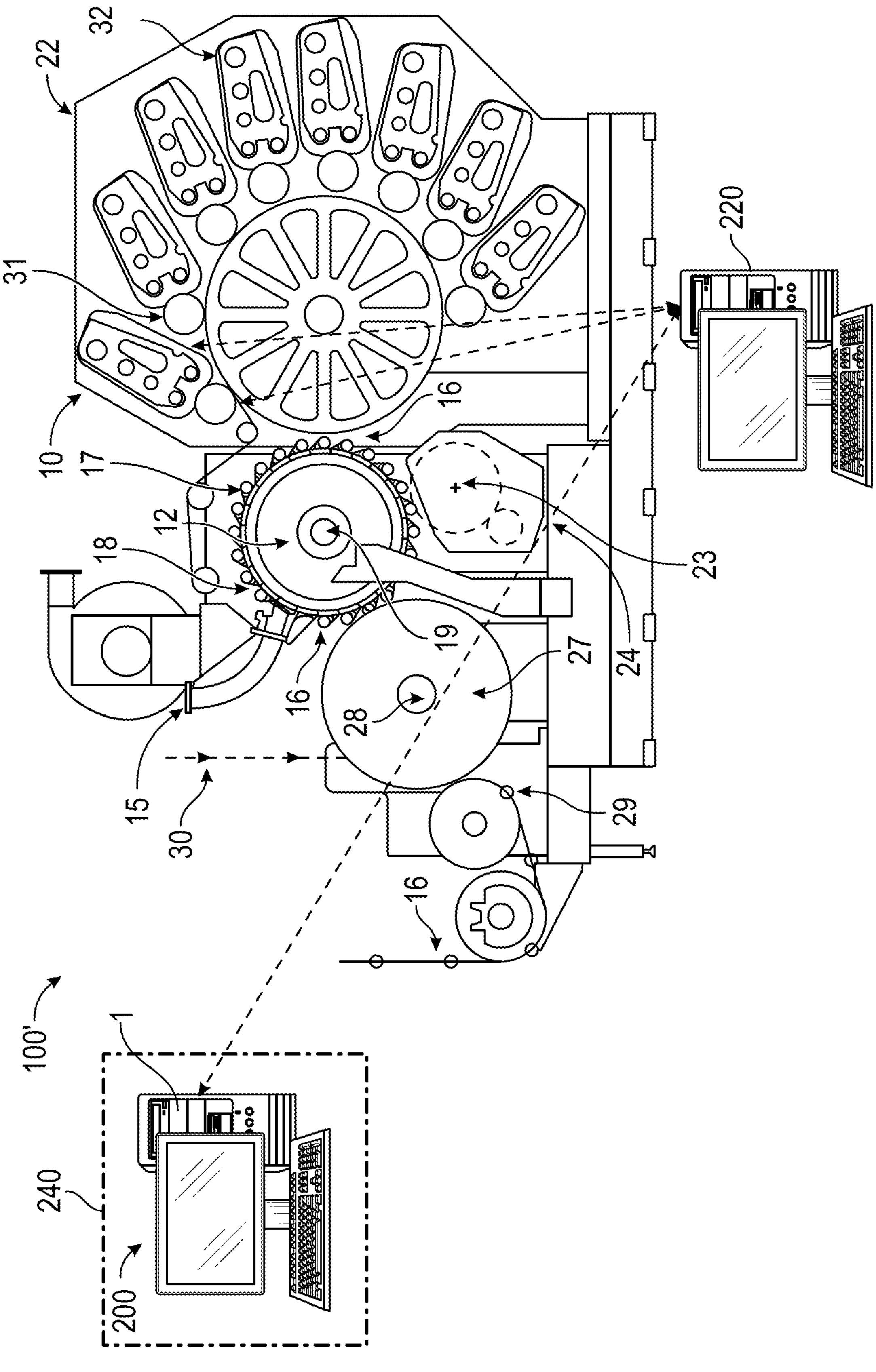
FIG. 3 is an exemplary can decorating system including an automatic label creator in accordance with a non-limiting, example embodiment of the disclosed concept.
Figure 4:
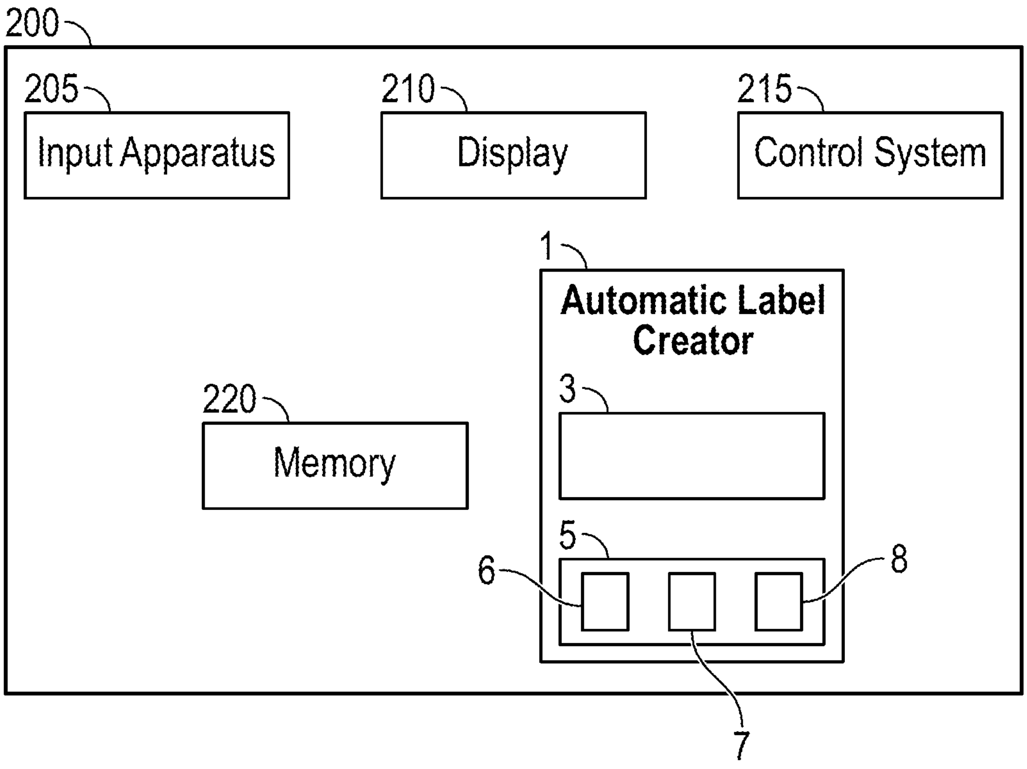
FIG. 4 is an exemplary control station including an automatic label creator in accordance with a non-limiting, example embodiment of the disclosed concept.

FIG. 2 illustrates a can decorating system 100 according to a non-limiting, example embodiment of the disclosed concept. The can decorating system 100 includes a can decorator 10 and a control station 200 including an automatic label creator 1. The control station 100 is communicatively coupled to the can decorator 10 in a wired or wireless connection and includes a control system 215 (as shown in FIG. 4) structured to monitor and control operations of the can decorator 10. The control station 200 may be, e.g., without limitation, a computer, a workstation, etc. disposed in vicinity of the can decorator 10. The control station 200 is discussed further with reference to FIG. 4. While FIGS. 2 and 4 illustrate the automatic label creator 1 disposed within the control station 200, it will be appreciated that the automatic label creator may be a standalone device, e.g., without limitation a PC or workstation solely structured to automatically create labels without departing from the scope of the disclosed concept. In the examples including a standalone automatic label creator, an input apparatus and a display may be included in the automatic label creator. In some examples, the control station 200 may be disposed in a main control room 240 that controls can manufacturing process as a whole as shown in FIG. 3. In those examples, the control station 200 may be coupled to a can decorator control station 220 that controls operations of the can decorator 10, and the automatic label creator 1 disposed in the control station 200 is communicatively coupled to the can decorator control station 220 and transmits a signal including at least a label and values for image registration to the can decorator control station 220. In some examples, a controller (not shown) having the same functionalities of the control station 200 may be disposed within the can decorator 10. In those examples, the automatic label creator 1 may be disposed within the controller.

The automatic label creator 1 is structured to receive a label specification, create a label, determine values for image registration based at least in part on the label specification and data associated with previously applied labels, and transmit at least the label and the values to the control station 200. Upon receiving at least the label and the values, the control station 200 (i.e., a control system 215 as shown in FIG. 4) causes the can decorator 10 to adjust printing components thereof and print the label on undecorated cans 16 based at least in part on the label and the values. The label specification is obtained from a customer (e.g., without limitation, a canned goods vendor) and may include at least images including, e.g., without limitation, an image of desired finished label, nutritional facts, regulatory disclosures, etc. to be printed on the cans 16. When a new label specification is received from a vendor, the user (e.g., without limitation, a can decorator operator) may stop the can decorator 10 via the control station 200 and input (e.g., without limitation, loads) the label specification to the automatic label creator 1 via an input apparatus 205.

Figure 5:
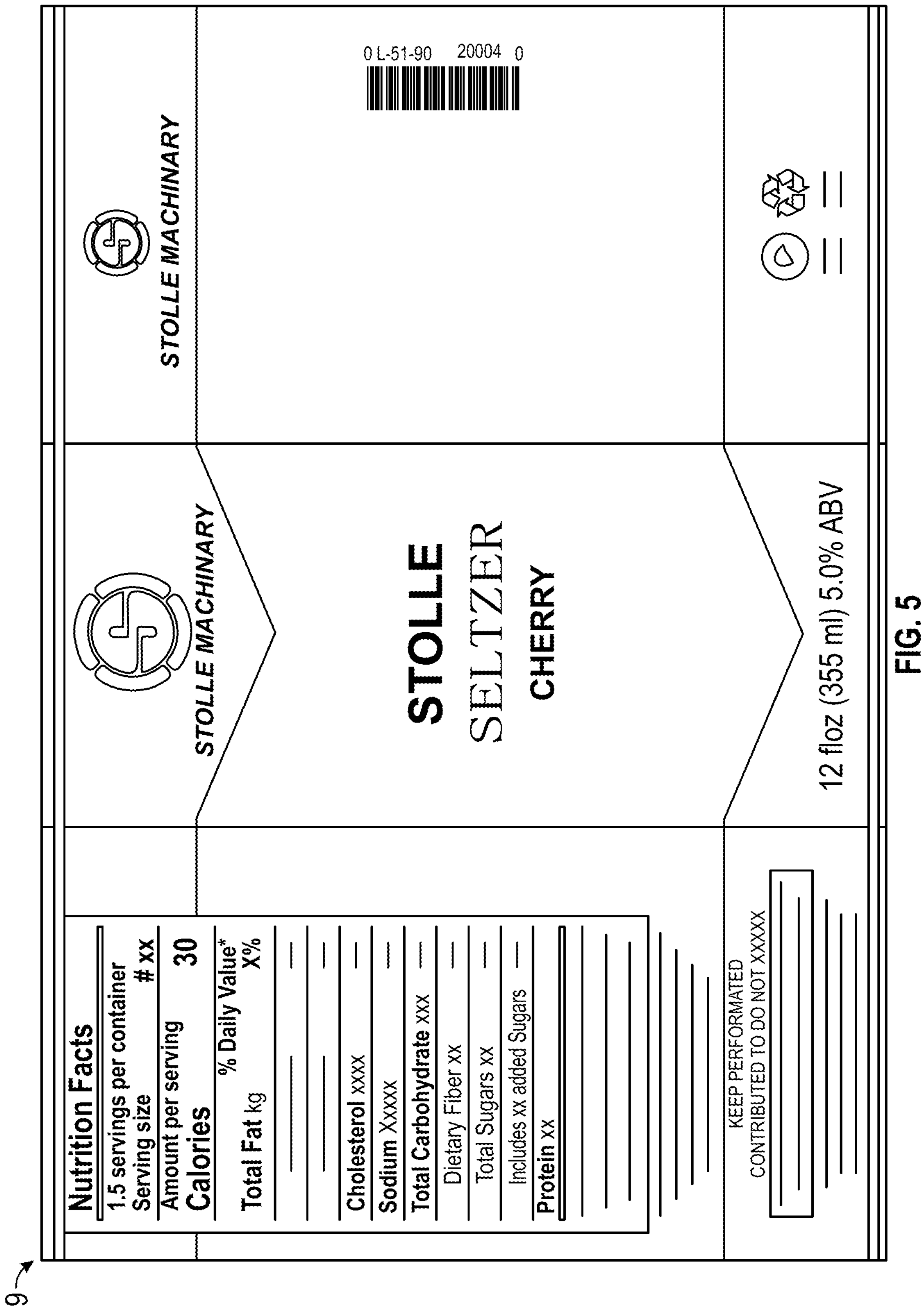
FIG. 5 is an exemplary label.

Upon receiving the label specification, the automatic label creator 1 is structured to create a label to be printed on undecorated cans 16. An example label is illustrated in FIG. 5. As shown in FIG. 5, a label may include, e.g., without limitation, colored images such as logos, nutritional facts, promotional detail, and/or regulatory disclosures. In some examples, the label may include a plurality of labels each corresponding to one cylinder plate and an associated inking station thereof.

Upon creating a label, the automatic label creator 1 is structured to determine values for image registration based on the label. Image registration includes, e.g., without limitation, plate cylinders and ink registration. Plate cylinders registration includes, e.g., without limitation, vertical registration that registers vertical (i.e., up or down) setpoints, circumferential registration that registers circumferential (i.e., right or left) setpoints, and plate pressure registration that registers plate pressure points. The plate cylinders registration is performed for each cylinder plate 31. For plate cylinders registration, the automatic label creator 1 is further structured to determine setpoints including vertical setpoints, circumferential setpoints and plate pressure points for each plate cylinder. Ink registration includes ink recipes that indicate, e.g., without limitation, how much base and pigment should be mixed to obtain a desired color, and include color registration parameters, e.g., without limitation, ink level, densities, tints, shade gradients, etc. For ink registration, the automatic label creator 1 is further structured to generate an ink recipe including at least color parameters for each inking station 32 and set ink key setpoints for respective inking stations 32.

The data associated with previously applied labels include at least respective registration information and corresponding can decorator information. Respective registration information includes, e.g., without limitation, previous setpoints and ink recipes that were optimized for the previously applied labels. Corresponding can decoration information includes at least can decorator conditions (e.g., without limitation, use, age, operational history, etc.) and environment information thereof (e.g., without limitation, ambient temperature, ambient moisture, etc.). For example, the automatic label creator 1 automatically and continuously collects data. The data may include at least data of the can decorator 10 and a plurality (e.g., without limitation, thousands) of cans 16 printed by the can decorator 10, can decorator conditions and ambient information thereof. Further, the automatic label creator 1 continuously updates the data and trains based at least in part on the updated data via the machine learning algorithm therein. In some examples, the data may also include data associated with previously applied labels, respective registration information and corresponding can decorator information of can decorators that have the same or different specifications as the can decorator 10, and operate at different locations (domestic and/or abroad). In those examples, the automatic label creator 1 can train based on a large amount of the globally collected data and optimize the values for image registration based on the large amount of the data, thereby significantly increasing the accuracy of at least the values determined as compared to when the automatic label creator 1 is training based on local data only or when the conventional label creation systems and methods requiring manual adjustments based on guesswork are being used.

Upon determining values for image registration, the automatic label creator 1 transmits at least the label and the values to the control station 200. In the examples using a can decorator having a controller therein, the automatic label creator 1 transmits the signal to the controller. The control system 215 then causes the can decorator 10, or printing components thereof to be adjusted based at least in part on the label and the values. The printing components may include, e.g., without limitation, a plurality of plate cylinders 31 and a plurality of inking stations 32, each plate cylinder 31 being associated with an individual inking station 32. Upon receiving the label and the values for image registration, the control system 215 causes at least the plate cylinders 31 and the inking stations 32 to be adjusted based at least in part on the label and the values. That is, the control system 215 causes the plate cylinders 31 to be moved to setpoints specified by the values and causes the inking stations 32 to set the ink fountain components based on the ink recipes. Upon being adjusted, the plurality of plate cylinders 31 and a plurality of inking stations 32 print the label on undecorated cans 16. In some examples, the control system 215 may include an automatic registration device (not shown) and/or an automated color registration device (e.g., without limitation, an automated ink fountain). In those examples, the automatic label creator 1 together with the automatic registration device and/or the automated ink fountain can significantly expedite the label creation and change process as compared to when the conventional label creation and change system and method are being used.

In some examples, the automatic label creator 1 is further structured to determine if the label is being printed on cans 16 as specified in at least one of the label and the label specification. For such determination, the automatic label creator 1 may obtain 3D images from, e.g., a camera or image sensor (not shown) disposed within, at, or in proximity to the can decorator 10, review the data for at one or more initially printed cans 16, and determine if the label on the one or more initially printed cans 16 appears as specified by at least one of the label or the label specification. In response to determining that the label has not been printed as specified, the automatic label creator 1 determines if the label and/or the values for image registrations need to be modified or the can decorator 10 needs to be adjusted further. For example, if the label included an error, e.g., an incorrect color density, the automatic label creator 1 determines that the label and/or the values for image registration need to be modified. In such example, the automatic label creator 1 is further structured to modify the label and/or the values for image registration, and transmit the modified label and/or the modified values to the control station 200. The control system 215 then causes one or more plate cylinders 31 and inking stations 32 to be adjusted based at least in part on the modified label and/or the modified values. If the automatic label creator 1 determines that the can decorator 10 needs to be adjusted further (e.g., without limitation, due to a damaged component in an inking station 32), but not the label, the automatic label creator 1 is further structured to cause the can decorator 10 to shut down and transmit an alert to at least one of the control station 200 or a can decorator operator. An alert may include an instruction (e.g., without limitation, replace the damaged component) for adjusting the can decorator 10. The control system 215 may adjust the can decorator 10 or the user may manually adjust the can decorator 10 based at least in part on the instruction. Upon adjusting the can decorator 10, the control system 215 turns on the can decorator 10 and the plurality of plate cylinders 31 and the plurality of inking stations 32 print the label on the undecorated cans 16 based at least in part on the label.

Therefore, the automatic label creator 1 according to the disclosed concept automatically creates a label and determines values for image registration without having to undertake the repeated manual adjustments based on the guesswork that are conventionally required for creating labels. Such automatic label creation eliminates human errors associated with the manual adjustments and the guesswork, significantly reduces can manufacturing time and costs, and increases accuracy in creating labels. Further, by utilizing the machine learning technologies based on a large amount of globally collected data and considering all relevant conditions, parameters, issues, and/or results pertaining to specific can decorators, the automatic label creator 1 further increases the accuracy in creating labels. In addition, by automatically modifying the label and/or the values for image registration based on instant data feedback from relevant sensors, the automatic label creator 1 increases the accuracy in creating labels even further. As a result of the increased accuracy, the automatic label creator 1 allows, e.g., without limitation, the plate cylinders 31 and the inking stations 32 to be adjusted and/or moved to correct locations at the first attempt.

FIG. 4 illustrates a block diagram of an exemplary control station 200 including an automatic label creator 1 in accordance with a non-limiting, example embodiment of the disclosed concept. The control station 200 is communicatively coupled to the can decorator 10. The control station 200 may be a PC, a workstation, or laptop computer and includes an input apparatus 205, a display 210, a control system 215, a memory 220 and an automatic label creator 1. The input apparatus 205 may be, e.g., without limitation, a keyboard, a touch screen, a USB portal, etc. The display 210 may be, e.g., without limitation, an LCD, an OLED, etc. A user is able to provide input into the automatic label creator 1 using the input apparatus 205. The control system 215 is structured to monitor and control the operations of various components of the can decorator 10. It may include a processor (e.g., without limitation, a microprocessor, a microcontroller, or some other suitable processing device). The memory 220 can be any one or more of a variety of types of internal and/or external storage media such as, without limitation, RAM, ROM, EPROM(s), EEPROM(s), FLASH, and the like that provide a storage register, i.e., a machine readable medium, for data storage such as in the fashion of an internal storage area of a computer, and can be volatile memory or nonvolatile memory, that interfaces with the memory. The memory 220 has stored herein a number of routines, instructions, or codes that are executable by the control system 215.

The automatic label creator 1 may include its own processor 3 and memory 5. The processor may be, e.g., without limitation, a microprocessor, a microcontroller, or some other suitable processing device or circuitry. The memory 5 can be any of one or more of a variety of types of internal and/or external storage media such as, without limitation, RAM, ROM, EPROM(s), EEPROM(s), FLASH, and the like that provide a storage register, i.e., a machine readable medium, for data storage such as in the fashion of an internal storage area of a computer, and can be volatile memory or nonvolatile memory. The memory 5 may store instructions 6 for at least automatically creating labels. It may also store data 7 associated with previously applied labels. The data 7 may include respective registration information and corresponding can decorator information. For example, the data 7 may include at least data of the can decorator 10 and a plurality (e.g., without limitation, thousands) of printed cans 16 by the can decorator 10 based on previously applied labels, can decorator conditions and ambient information thereof. The data 7 may also include similar information associated with can decorators that have the same or different specifications as the can decorator 10, and operate at different locations (domestic and abroad). The automatic label creator 1 continuously and automatically updates the data 7. The memory 5 may also include a machine learning algorithm 8, which trains based on the data 7 and executes the instructions 6 based at least in part on the training. The automatic label creator 1 further outputs a signal to enable the display 210 to display real time information, e.g., without limitation, a label specification being input, a new label being created, values being determined, ink recipes being generated, data being captured including the cans being printed, etc. The automatic label creator 1 also transmits a signal including a label, values for image registration, and ink recipes to the control station 200. In some examples, the automatic label creator 1 may be included within the control system 215 of the control station 200.

FIG. 5 illustrates an example label 9 created by the automatic label creator 1 of FIGS. 2-4 in accordance with a non-limiting, example embodiment of the disclosed concept. The label 9 may include, e.g., without limitation, images, nutritional facts, regulatory disclosures, container sizes, etc. as set forth in the label specification from the vendor. The label 9 may be digitally printed onto undecorated cans via, e.g., without limitation, a film.

Figure 6:
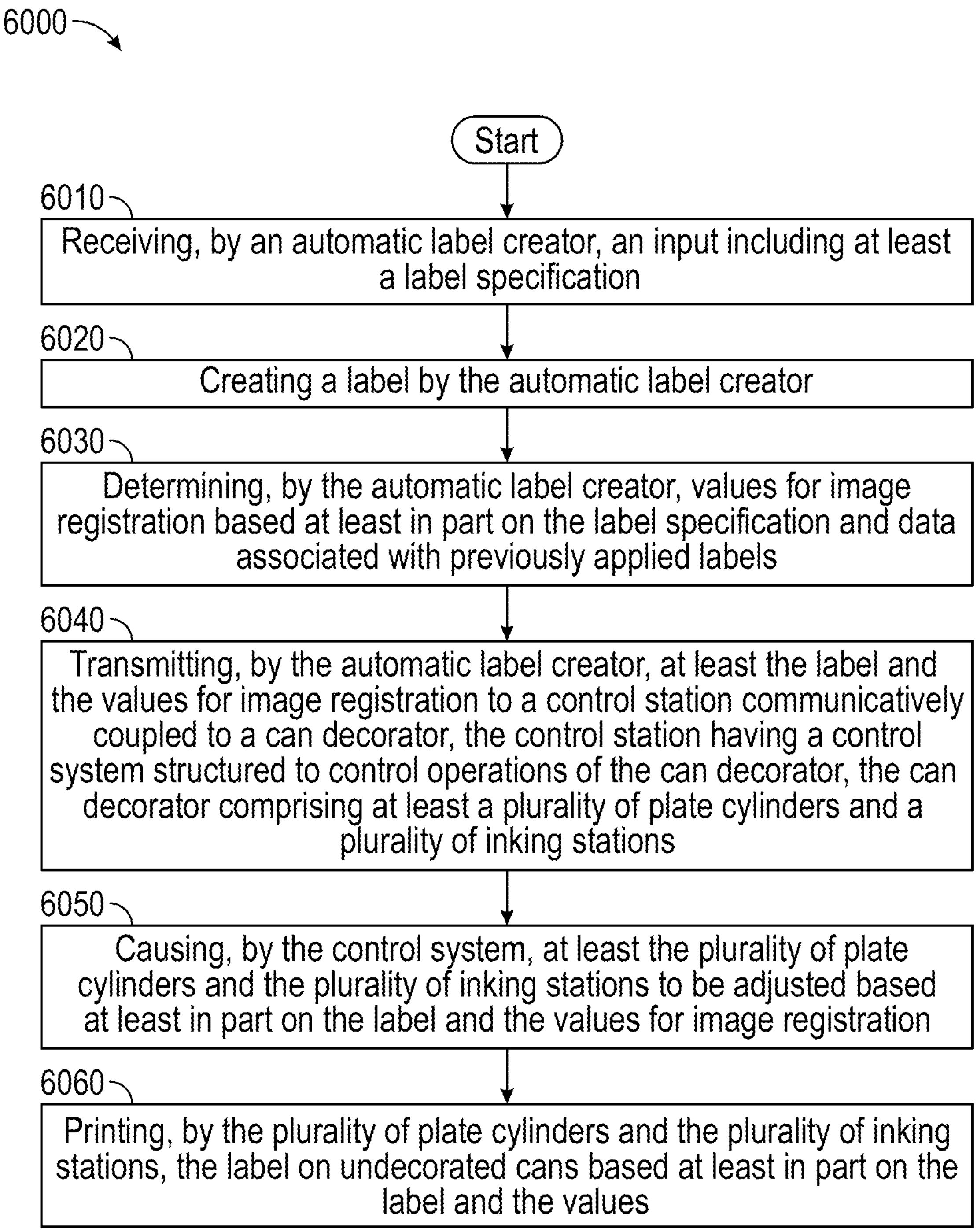
FIG. 6 is a flow chart for a method of automatically creating a label in accordance with a non-limiting, example embodiment of the disclosed concept.

FIG. 6 is a flow chart for a method 6000 for automatically creating recipe label for use in a can decorating system according to a non-limiting, example embodiment of the disclosed concept. The can decorating system is similar to the can decorating system 100,100' as described with reference to FIGS. 2-3. The method 6000 may be performed by the automatic label creator 1, the can decorator 10 and/or the components thereof.

At 6010, the automatic label creator receives an input including at least a label specification.

At 6020, the automatic label creator creates a label.

At 6030, the automatic label creator determines values for image registration based at least in part on the label specification and data associated with previously applied labels.

At 6040, the automatic label creator transmits at least the label and the values for image registration to a control station of the can decorator. The control station is communicatively coupled to the can decorator and receives at least the label and the values. The control station includes a control system structured to monitor and control operations of the can decorator.

At 6050, a control system of the control station causes at least the plurality of plate cylinders and the plurality of inking stations to be adjusted based at least in part on the label and the values for image registration. Upon adjusting, the control system causes the can decorator to be turned on. In some examples, based on the label and the values for the image registration from the automatic label creator, adjustment(s) to the can decorator components may be made manually.

At 6060, the plurality of plate cylinders and inking stations print the label on undecorated cans based at least in part on the label and the values.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of disclosed concept which is to be given the full breadth of the claims appended and any and all equivalents thereof.

What is claimed is:

1. A can decorating system, comprising:

a can decorator including at least a plurality of plate cylinders and a plurality of inking stations, each plate cylinder being associated with an individual inking station; and a control station communicatively coupled to the can decorator, the control station comprising:

an input apparatus structured to receive an input including at least a label specification;

a display structured to display real time information including at least the label specification;

a control system structured to monitor and control operations of the can decorator; and an automatic label creator comprising a memory, the automatic label creator being structured to receive the label specification, to create a label, and to determine values for image registration based on the label and values for image registration and corresponding can decorator information for previously applied labels, wherein the control system causes at least the plurality of plate cylinders and the plurality of inking stations to be adjusted based on the determined values for image registration, and wherein upon being adjusted, the plurality of plate cylinders and the plurality of inking stations print the label on undecorated cans, wherein the values for image registration include vertical and circumferential setpoints for each plate cylinder, pressure setpoints for each plate cylinder, and ink recipes for each inking station, and wherein the corresponding can decorator information includes can decorator conditions and environmental information for the previously applied labels.

2. The system of claim 1, wherein the ink recipes include color parameters for each inking station.

3. The system of claim 1, wherein the memory includes a machine learning algorithm, and wherein the automatic label creator automatically and continuously collects values for image registration and corresponding can decorator information, updates the values for image registration and corresponding can decorator information, and trains based at least in part on the updated values for image registration and can decorator information.

4. The system of claim 1, wherein the can decorator conditions include use, age and operational history of the can decorator and the environmental information includes ambient temperature and ambient moisture.

5. The system of claim 1, wherein the values for image registration and corresponding can decorator information for previously applied labels includes values for image registration and corresponding can decorator information from different can decorators.

6. The system of claim 2, wherein the values for image registration include ink key setpoints for the inking stations.

7. The system of claim 1, wherein the automatic label creator is further structured to determine if the label is being printed on the undecorated cans as specified in at least one of the label and the label specification.

8. The system of claim 7, wherein for determining if the label is being printed on the undecorated cans as specified, the automatic label creator is further structured to determine if applied label appears on one or more initially printed cans as specified in at least one of the label and the label specification.

9. The system of claim 8, wherein in response to a determination that the applied label does not appear on one or more initially printed cans, the automatic label creator is further structured to determine if the label and/or the values for image registration need to be adjusted or the can decorator needs to be adjusted.

10. The system of claim 9, wherein in response to a determination that the automatic label and/or the values for image registration need to be adjusted, the automatic label creator is further structured to modify the label and/or the values for image registration and transmit the modified label and/or the modified values for image registration to the control system, wherein the control system causes one or more plate cylinders and inking stations to be adjusted based at least in part on the modified label and/or the modified values for image registration.

11. The system of claim 9, wherein in response to a determination that the can decorator needs to be adjusted, the automatic label creator is further structured to cause the can decorator to shut down and transmit an alert to a can decorator operation, the alert including an instruction for adjusting the can decorator, wherein the control system adjusts the can decorator based at least in part on the instruction and, upon adjusting the can decorator, turns on the can decorator.

12. An automatic label creator for use in can decorating by a can decorator having at least a plurality of plate cylinders and a plurality of inking stations, each plate cylinder associated with an individual inking station, the can decorator being communicatively coupled to a control station including a control system structured to control operations of the can decorator communicatively coupled to the control station, the automatic label creator comprising:

an input apparatus structured to receive an input including at least a label specification obtained from a vendor;

a display structured to display real time information including at least the label specification; and an automatic label creator controller comprising a memory, the automatic label creator controller being structured to receive the label specification, to create a label, to determine values for image registration based on the label and values for image registration and corresponding can decorator information for previously applied labels, and to transmit at least the label and the values of image registration to the control station, wherein the control system of the control station causes the plurality of plate cylinders and the plurality of inking stations to be adjusted based on the determined values for image registration, and wherein, upon being adjusted, the plurality of plate cylinders and the plurality of inking stations print the label on undecorated cans, wherein the values for image registration include vertical and circumferential setpoints for each plate cylinder, pressure se points for each plats cylinder, and ink recipes for each inking station, and wherein ding can decorator information includes can decorator conditions and environmental information for the previously applied labels.

13. A method for automatically creating a label, comprising, receiving, by an automatic label creator, an input including at least a label specification;

creating a label by the automatic label creator;

determining, by the automatic label creator, values for image registration based on the label and values for image registration and corresponding can decorator information for previously applied labels;

transmitting, by the automatic label creator, the determined values for image registration to a control station communicatively coupled to a can decorator, the control station including a control system structured to control operations of the can decorator, the can decorator comprising at least a plurality of plate cylinders and a plurality of inking stations;

causing, by the control system, at least the plurality of plate cylinders and the plurality of inking stations to be adjusted based on the determined values for image registration; and printing, by the plurality of plate cylinders and the plurality of inking stations, the label on undecorated cans, wherein the values for image registration include vertical and circumferential setpoints for each plate cylinder, pressure setpoints for each plate cylinder, and ink recipes for each inking station, and where the corresponding can decorator information includes can decorator conditions and environment information for the previously applied labels.

14. The method of claim 13, wherein the ink recipes include color parameters for each inking station.

15. The method of claim 13, wherein the automatic label creator includes a memory comprising a machine learning algorithm, the method further comprising:

collecting automatically and continuously, by the automatic label creator, values for image registration and corresponding can decorator information;

updating the values for image registration and corresponding can decorator information by the automatic label creator; and training, by the automatic label creator, based on the updated values for image registration and corresponding can decorator information.

16. The method of claim 13, wherein the can decorator conditions include use, age and operational history of the can decorator and the environmental information includes ambient temperature and ambient moisture.

17. The method of claim 13, wherein the values for image registration and corresponding can decorator information for previously applied labels includes values for image registration and corresponding can decorator information for different can decorator.

18. The method of claim 13, further comprising:

determining, by the automatic label creator, if the label is being printed on the undecorated cans as specified in at least one of the label and the label specification; and in response to determining that the label is not being printed on the undecorated cans as specified in at least one of the label and the label specification, determining, by the automatic label creator, if the label and/or the values for image registration need to be adjusted or the can decorator needs to be adjusted.

19. The method of claim 18, further comprising:

in response to a determination that the label and/or the values for image registration needs to be adjusted, modifying, by the automatic label creator, the label and/or the values for image registration;

transmitting, by the automatic label creator, the modified label and/or the modified values for image registration to the control station;

causing, by the control system, one or more plate cylinders and inking stations to be adjusted based at least in part on the modified label and/or the modified values for image registration;

turning on, by the control system, the can decorator; and printing, by the adjusted one or more plate cylinders and inking stations based at least in part on the modified label and/or the modified values for image registration.

20. The method of claim 18, further comprising:

in response to a determination that the can decorator needs to be adjusted, causing, by the automatic label creator, the can decorator to shut down;

transmitting, by the automatic label creator, an alert to the control system, the alert including an instruction for adjusting the can decorator;

adjusting, by the control system, the can decorator based at least in part on the instruction;

turning on, by the control system, the can decorator; and printing, by the plurality of plate cylinders and the plurality of inking stations, the label on the undecorated cans.

* * * * *